US012573404B2

(12) United States Patent
Lee et al.

(10) Patent No.: US 12,573,404 B2
(45) Date of Patent: Mar. 10, 2026

(54) ELECTRONIC DEVICE AND METHOD OF OPERATING THE SAME

(71) Applicant: Samsung Electronics Co., Ltd., Suwon-si (KR)

(72) Inventors: Sijun Lee, Suwon-si (KR); Seongrok Lee, Suwon-si (KR); Changyong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/442,375

(22) Filed: Feb. 15, 2024

(65) Prior Publication Data

US 2024/0203421 A1     Jun. 20, 2024

Related U.S. Application Data

(63) Continuation of application No. PCT/KR2023/020624, filed on Dec. 14, 2023.

(30) Foreign Application Priority Data

Dec. 14, 2022    (KR) ........................ 10-2022-0174596

(51) Int. Cl.
G10L 15/30          (2013.01)
G10L 15/08          (2006.01)
G10L 15/22          (2006.01)

(52) U.S. Cl.
CPC .............. G10L 15/30 (2013.01); G10L 15/08 (2013.01); G10L 15/22 (2013.01)

(58) Field of Classification Search
USPC ...................................................... 704/1–504
See application file for complete search history.

(56) References Cited

U.S. PATENT DOCUMENTS 11,024,311 B2 *   6/2021   Mixter ................... G10L 15/32
11,031,011 B2 *   6/2021   Park ....................... G06F 3/167
(Continued)

FOREIGN PATENT DOCUMENTS

JP          2002-182688 A      6/2002
KR          10-1832648 B1      2/2018
(Continued)

OTHER PUBLICATIONS

International Search Report dated Mar. 26, 2024, issued in International Patent Application No. PCT/KR2023/020624.

*Primary Examiner* — Marcus T Riley
(74) *Attorney, Agent, or Firm* — Jefferson IP Law, LLP

(57)          ABSTRACT

An electronic device is provided. The electronic device includes a device detector, an intelligence device resolver (IDR), and a device selector. The device detector may receive user utterance information and identification information of multi-device wakeup (MDW) devices participating in MDW contention from a first electronic device selected in the MDW contention. The IDR may identify room information for locations of the MDW devices, based on the identification information of the MDW devices, and acquire device information of the MDW devices and devices located in an equal space to the MDW devices. The device selector may execute a command according to a user utterance, based on the device information of the MDW devices and the devices located in the equal space to the MDW devices.

21 Claims, 10 Drawing Sheets

(56) References Cited

U.S. PATENT DOCUMENTS

| | | | |
|---|---|---|---|
| 11,037,562 B2 * | 6/2021 | Shah | G06F 3/167 |
| 11,189,268 B2 | 11/2021 | Park et al. | |
| 11,200,897 B2 * | 12/2021 | Yi | G06F 3/167 |
| 11,443,738 B2 * | 9/2022 | Choi | G06F 18/24 |
| 11,500,672 B2 * | 11/2022 | Zeitlin | G06F 3/167 |
| 12,204,932 B2 * | 1/2025 | Zeitlin | G10L 15/285 |
| 2018/0146042 A1 * | 5/2018 | Choi | G10L 15/22 |
| 2019/0115025 A1 | 4/2019 | Choi | |
| 2020/0043490 A1 * | 2/2020 | Park | G06F 3/167 |
| 2020/0118562 A1 * | 4/2020 | Choi | G06F 18/24 |
| 2020/0126550 A1 * | 4/2020 | Kim | G06F 3/167 |
| 2020/0135194 A1 * | 4/2020 | Jeong | G10L 17/12 |
| 2020/0135212 A1 * | 4/2020 | Cho | G10L 17/22 |
| 2020/0342869 A1 | 10/2020 | Lee et al. | |
| 2021/0174810 A1 * | 6/2021 | Kim | G10L 15/32 |
| 2021/0272572 A1 * | 9/2021 | Karpukhin | G10L 17/10 |
| 2021/0280181 A1 * | 9/2021 | Saito | G06F 3/013 |
| 2022/0093100 A1 | 3/2022 | Olson et al. | |
| 2022/0122602 A1 * | 4/2022 | Cho | H04N 21/44218 |
| 2022/0179619 A1 * | 6/2022 | Cho | G06Q 10/1093 |
| 2022/0223150 A1 | 7/2022 | Li et al. | |
| 2022/0319507 A1 | 10/2022 | Jung et al. | |
| 2023/0026093 A1 * | 1/2023 | Noma | G10L 15/22 |
| 2024/0203421 A1 * | 6/2024 | Lee | G10L 15/08 |

FOREIGN PATENT DOCUMENTS

| | | | | |
|---|---|---|---|---|
| KR | 10-2018-0119070 A | 11/2018 | | |
| KR | 10-2019-0042919 A | 4/2019 | | |
| KR | 10-2019-0084003 A | 7/2019 | | |
| KR | 10-2020-0047311 A | 5/2020 | | |
| KR | 10-2021-0010501 A | 1/2021 | | |
| KR | 20210010501 A * | 1/2021 | | G06F 3/167 |
| KR | 10-2022-0037846 A | 3/2022 | | |
| KR | 10-2022-0049778 A | 4/2022 | | |
| KR | 10-2421255 B1 | 7/2022 | | |

* cited by examiner

| Rank | MDW Score | Device Name |
|------|-----------|-------------|
| 1 | 96 | Speaker |
| 2 | 80 | TV |
| 3 | 0 | Mobile |

700

"deviceId": "deviceId-example-12345",
"serviceId": "abcdefghij1234",
"bixbyDeviceType": "speaker",
"deviceName": "Home Mini_UCC",
"bixbyLocale": "ko-KR",
"pushId": "pushId1234",
"iotDeviceId": "abcd-efgh",
...

Figure 8:
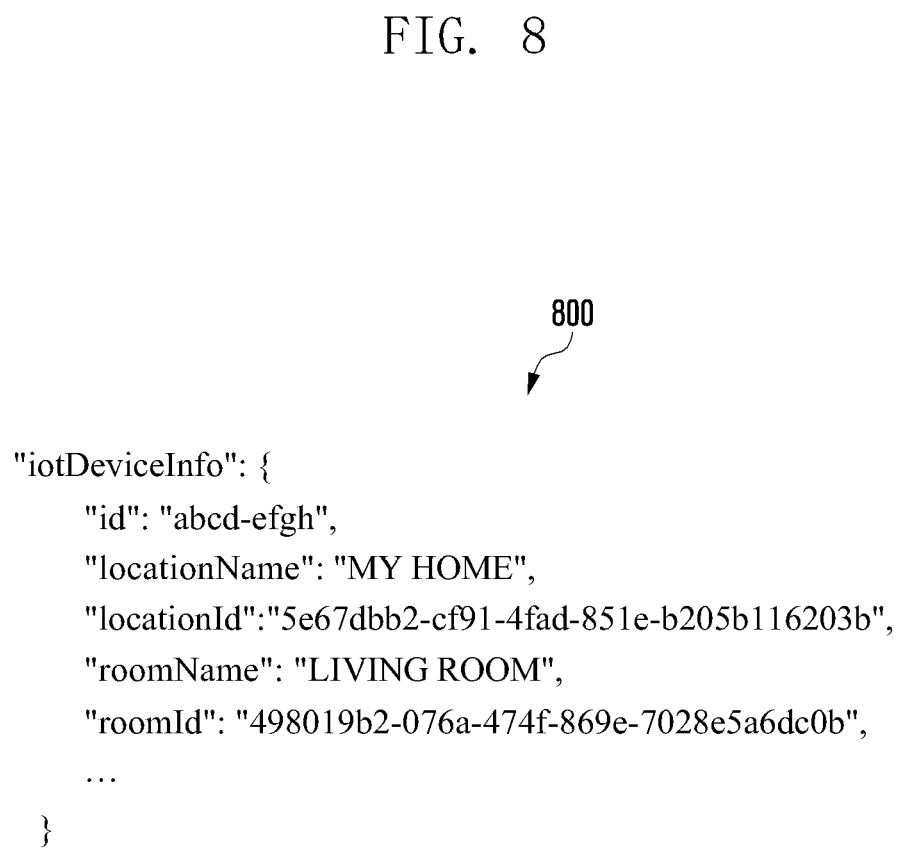

"iotDeviceInfo": {
    "id": "abcd-efgh",
    "locationName": "MY HOME",
    "locationId":"5e67dbb2-cf91-4fad-851e-b205b116203b",
    "roomName": "LIVING ROOM",
    "roomId": "498019b2-076a-474f-869e-7028e5a6dc0b",
    ...
}

ELECTRONIC DEVICE AND METHOD OF OPERATING THE SAME

CROSS-REFERENCE TO RELATED APPLICATION(S)

This application is a continuation application, claiming priority under § 365(c), of an International application No. PCT/KR2023/020624, filed on Dec. 14, 2023, which is based on and claims the benefit of a Korean patent application number 10-2022-0174596, filed on Dec. 14, 2022, in the Korean Intellectual Property Office, the disclosure of which is incorporated by reference herein in its entirety.

TECHNICAL FIELD

The disclosure relates to an electronic device for recognizing an utterance of a user in a multi-device environment and performing an operation according to the utterance of the user and a method of operating the same.

BACKGROUND ART

A voice recognition function may be implemented in various electronic devices including a voice input device. An assistance service which can provide an intuitive interface between electronic devices is being developed. The assistance service may perform natural language processing for an utterance of a user to infer a user's intention and allow the electronic device to perform an operation based on the inferred intention of the user intention. For example, the electronic device may recognize the utterance of the user through the voice recognition function and detect an intention of the user utterance. Thereafter, the electronic device may perform an operation corresponding to the utterance of the user. More particularly, in a multi-device environment, a device capable of performing an operation suitable for a user's intention should be determined among a plurality of electronic devices and an operation according to an utterance of the user should be normally performed.

The above information is presented as background information only to assist with an understanding of the disclosure. No determination has been made, and no assertion is made, as to whether any of the above might be applicable as prior art with regard to the disclosure.

DISCLOSURE

Technical Problem

In a multi-device environment, a device which is not intended by a user may wake up and thus an operation intended by the user may not be normally performed. In order to solve the problem, all devices may wake up and recognize a command according to the utterance of the user, and a device to perform the command according to the utterance of the user may be determined. However, overlapping calculations for recognizing an utterance and understanding a natural language are generated since all devices are required to wake up and an operation for configuring a device to perform an action among all devices should be added. Further, due to the overlapping calculations for recognizing the utterance and understanding the natural language, a response speed may become slower and final operation execution may be delayed.

In another method, a device to perform the operation according to the user's intention may be included in the utterance and the command may be transferred to the device. For example, when the user desires to execute a specific app (for example, a Netflix app), a device to perform an action may be inserted into an utterance like "Open Netflix on the TV" and the command may be transferred to the television (TV), but it may inconvenience the user to use the service because the user should explicitly insert the device into the utterance. Further, it may inconvenience the user to use the service because the user should clearly insert the device to perform the action and the action execution command into the utterance through the same pattern in all action execution.

Aspects of the disclosure are to address at least the above-mentioned problems and/or disadvantages and to provide at least the advantages described below. Accordingly, an aspect of the disclosure is to provide an electronic device and a method of operating the same capable of implementing the final operation performance result to be close to a user's intention although a device which is not intended by the user wakes up by a multi-device wakeup (MDW) in the multi-device environment.

Another aspect of the disclosure is to provide an electronic device and a method of operating the same capable of selecting an execution device to perform the operation according to the user utterance based on information on a winner device and/or devices located in the same space as electronic devices participating in MDW contention.

Another aspect of the disclosure is to provide an electronic device and a method of operating the same capable of selecting a device suitable for a user's intention and performing the final operation with reference to not only information on devices located in the same space as devices participating in MDW contention but also content including an installed application, whether media is reproduced, and restriction information, such as a device or a country.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a device detector, an intelligence device resolver (IDR), and a device selector. The device detector may receive user utterance information and identification (ID) information of MDW devices participating in MDW contention from a first electronic device selected in the MDW contention. The IDR may identify room information for locations of the MDW devices, based on the identification information of the MDW devices, and acquire device information of the MDW devices and devices located in an equal space to the MDW devices. The device selector may execute a command according to a user utterance, based on the device information of the MDW devices and the devices located in the equal space to the MDW devices.

In accordance with another aspect of the disclosure, a method of operating an electronic device is provided. The method includes receiving user utterance information and identification information of MDW devices participating in MDW contention from a first electronic device selected in the MDW contention. Room information for locations of the MDW devices may be identified based on the identification information of the MDW devices. Device information of the MDW devices and devices located in an equal space to the MDW devices may be acquired. An executor device to execute a command according to a user utterance may be selected based on the device information of the MDW devices and the devices located in the equal space to the MDW devices.

Advantageous Effects

According to an electronic device and a method of operating the same according to various embodiment of the disclosure, the final operation performance result may be close to a user's intention although a device which is not intended by the user wakes up by the MDW in the multi-device environment.

According to an electronic device and a method of operating the same according to various embodiment of the disclosure, even a device (mobile device) of which a client is not updated by the user or which has no location information can infer a place by using neighbor device information. Accordingly, it is possible to increase the accuracy of determining a device to perform an operation according to a user utterance by using the place for finding information on devices located in the same space.

According to an electronic device and a method of operating the same according to various embodiment of the disclosure, when a final device implementing the result selected by a capsule classifier is selected, not only information on devices located in the same space but also content including an installed application, whether media is reproduced, and restriction information, such as a device or a country may be referred to. Therefore, it is possible to select a device suitable for a user's intention and perform the final operation.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain various embodiments of the disclosure will be more apparent from the following description taken in conjunction with the accompanying drawings, in which:

FIG. 2 is a block diagram illustrating an intelligent assistance system including an electronic device which performs an operation according to an utterance of a user in a multi-device environment according to various embodiment of the disclosure;

FIG. 4 illustrates a multi-device wakeup (MDW) operation according to various embodiment of the disclosure;

4

Figure 9:
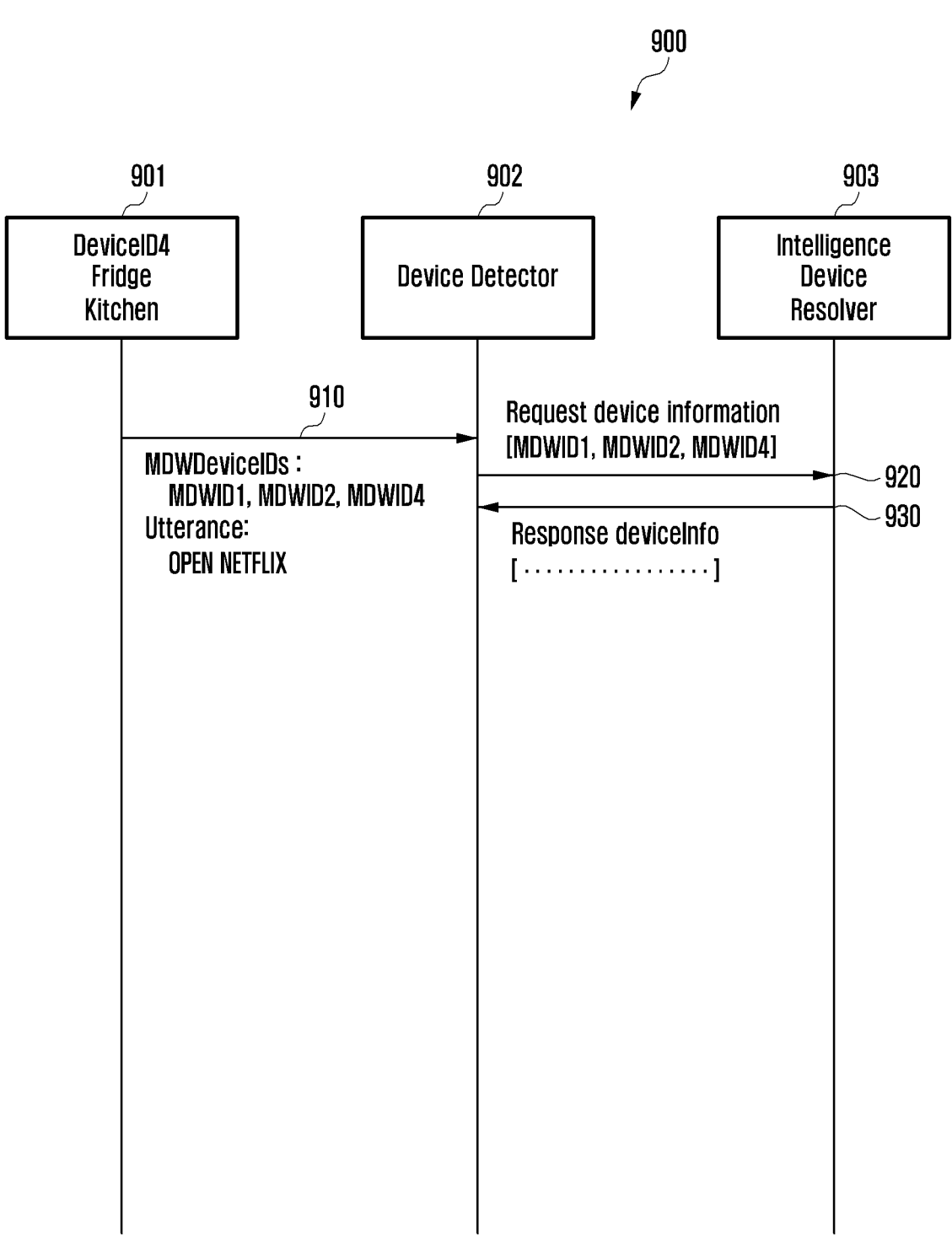
Figure 10:
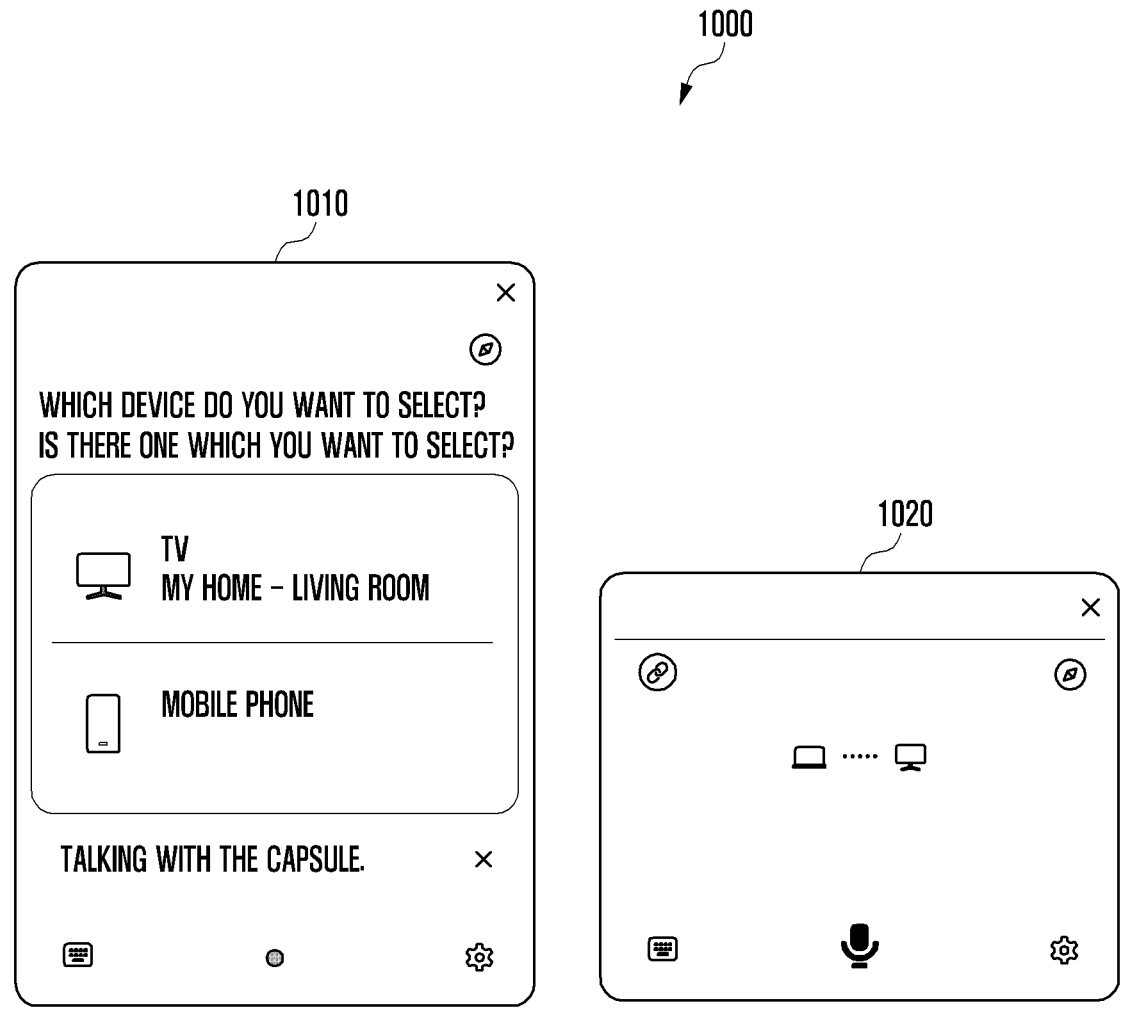

FIG. 8 illustrates an Internet of things (IOT) device information message including room information according to various embodiment of the disclosure;

FIG. 9 illustrates a method of operating an electronic device according to various embodiment of the disclosure; and FIG. 10 illustrates a user interface for selecting an executor device in a multi-device environment according to various embodiment of the disclosure.

Throughout the drawings, it should be noted that like reference numbers are used to depict the same or similar elements, features, and structures.

MODE FOR INVENTION

The following description with reference to the accompanying drawings is provided to assist in comprehensive understanding of various embodiment of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and equivalents.

It is to be understood that the singular forms "a," "an," and "the" include plural referents unless the context clearly dictates otherwise. Thus, for example, reference to "a component surface" includes reference to one or more of such surfaces.

Figure 1:
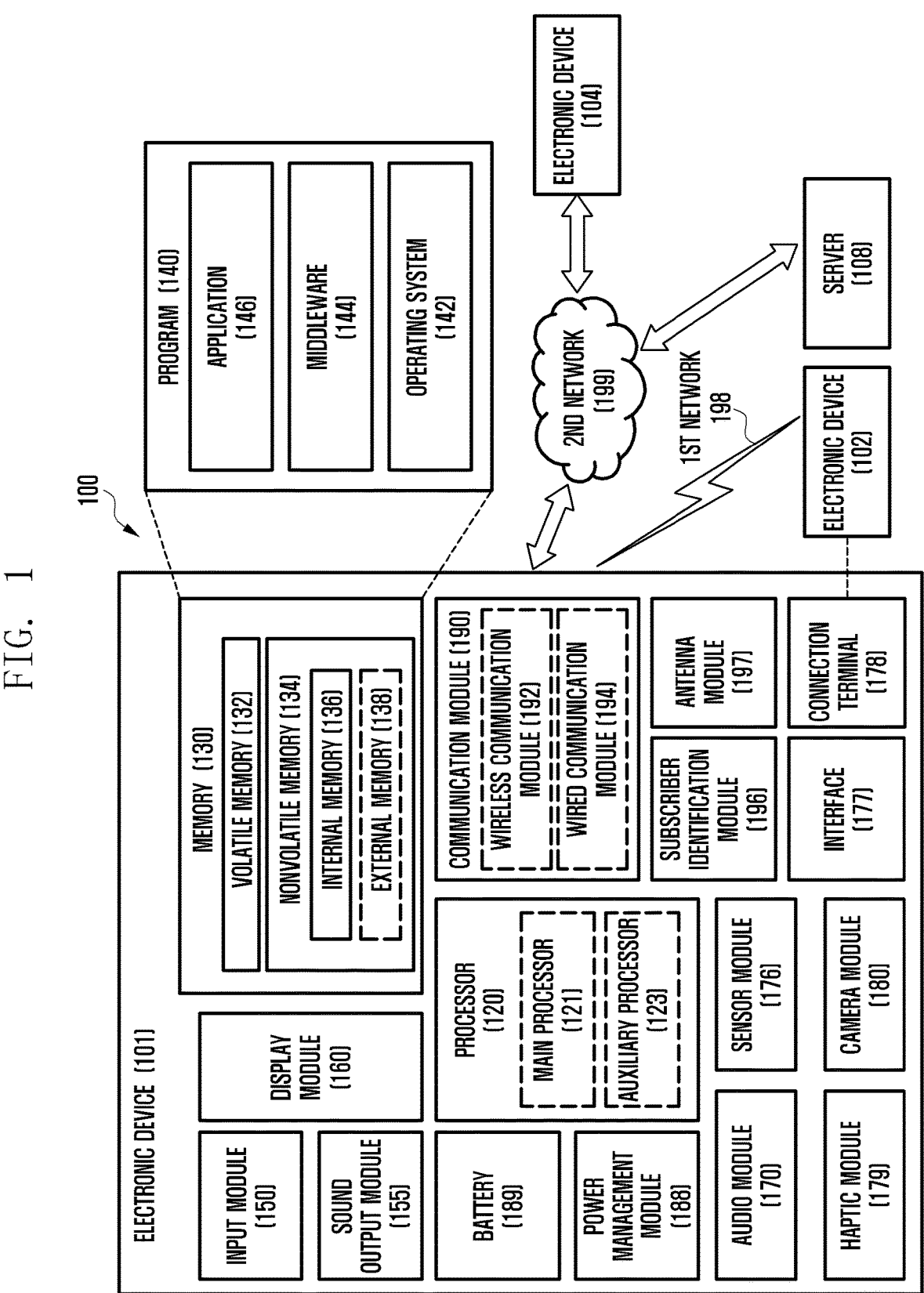
FIG. 1 is a block diagram of an electronic device within a network environment according to various embodiment of the disclosure.

FIG. 1 is a block diagram illustrating an electronic device in a network environment according to various embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to various embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 database (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device 101 illustrated in FIG. 1 may include at least one of a wearable electronic device, a smart watch, an augmented reality (AR) electronic device, a virtual reality (VR) electronic device, a smart home appliance (for example, a refrigerator, an air conditioner, or a smart TV), a mobile phone (for example, a smartphone), a notebook personal computer (PC), a tablet PC, and/or an audio electronic device, and a hearable electronic device (for example, an Internet of things (IOT) speaker, wired earphones, or wireless earphones).

Figure 2:
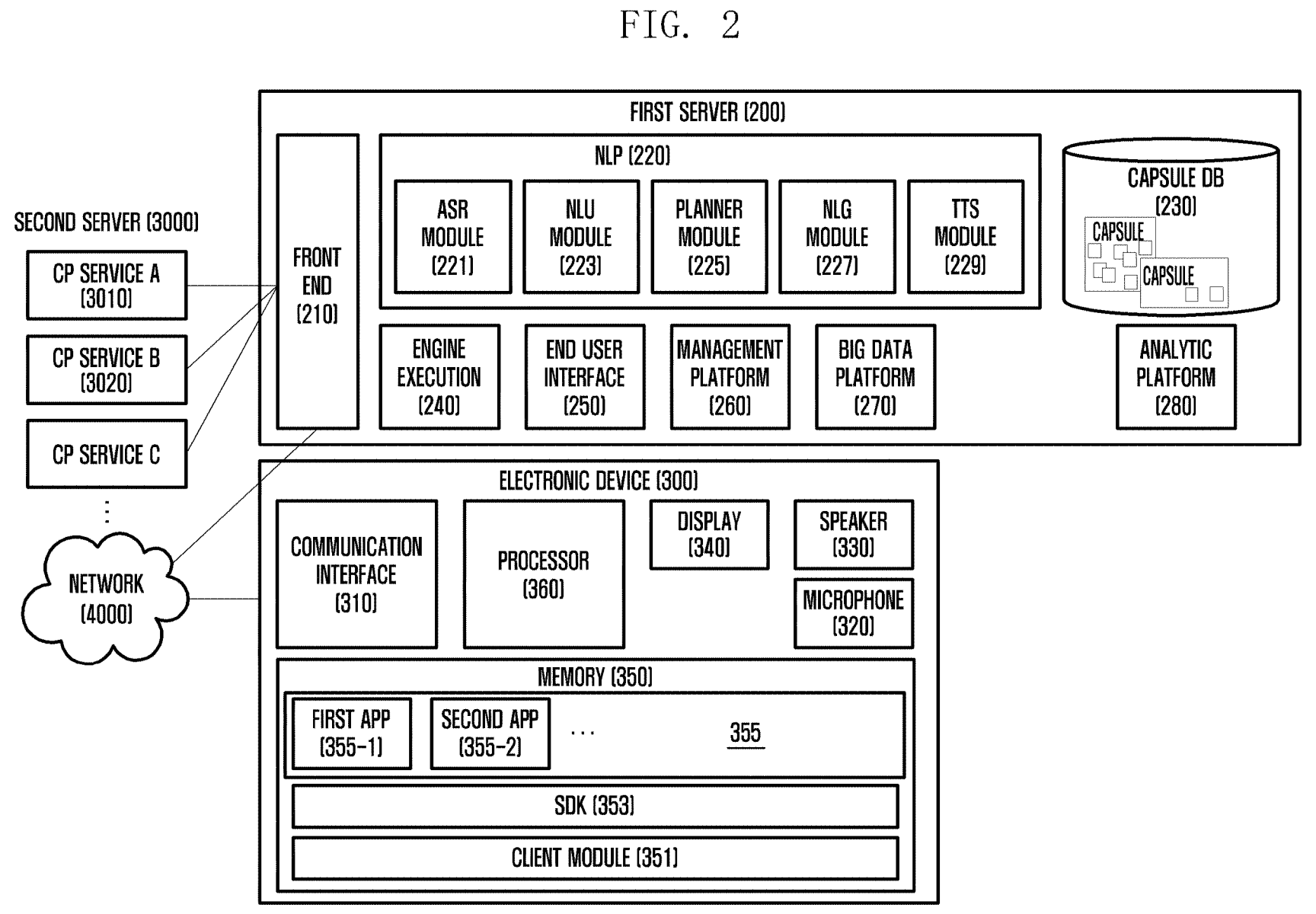

FIG. 2 is a block diagram illustrating an intelligent assistance system including an electronic device which performs an operation according to an utterance of a user in a multi-device environment according to various embodiment of the disclosure.

Referring to FIG. 2, the intelligence assistance system may include a first server 200 (for example, an intelligent server) (for example, the first server 108 of FIG. 1), a second server 3000 (for example, a service server), and an electronic device 300 (for example, a user terminal) (for example, the electronic device 101 of FIG. 1). Although FIG. 2 illustrates one electronic device 300, the intelligent assistance system may include a plurality of electronic devices.

According to various embodiment of the disclosure, the first server 200 (for example, the intelligence server), the second server 3000 (for example, the service server), and the electronic device 300 (for example, the user terminal) may be connected to each other through a network 4000 (for example, an Internet network, a 4G communication network, or a 5G communication network) (for example, the first network 198 or the second network 199 of FIG. 1) through CP service A 3010, CP service B 3020, and CP service C.

According to various embodiment of the disclosure, the electronic device 300 may include a user terminal (for example, a portable communication device, a smartphone, a personal digital assistant (PDA), a notebook computer, a TV, white goods, a wearable device, a head-mounted display (HMD), or a smart speaker) which can be connected to the network 4000.

According to various embodiment of the disclosure, the electronic device 300 may include a communication interface 310 (for example, the communication module 180 and the interface 177 of FIG. 1), a microphone 320 (for example, the audio module 170 of FIG. 1), a speaker 330 (for example, the sound output module 155 of FIG. 1), a display 340 (for example, the display module 160 of FIG. 1), a memory 350 (for example, the memory 130 of FIG. 1), and a processor (for example, the processor 120 of FIG. 1).

For example, the elements of the electronic device 300 may be operatively or electrically connected to each other. For example, the communication interface 310 may be connected to an external device and configured to transmit and receive data. For example, the microphone 320 may receive a sound (for example, a user's utterance) and convert the same into an electrical signal. For example, the speaker 330 may output the electrical signal in the form of a sound (for example, a voice). For example, the display 340 may be configured to display an image or a video. The display 340 may display a graphical user interface (GUI) of an executed app (or application program).

According to various embodiment of the disclosure, the memory 350 may include a client module 351, a software development kit (SDK) 353, and a plurality of apps 355. The client module 351, the software development kit (SDK) 353, and the plurality of apps 355 may be stored in a storage space included in the memory 350.

For example, the client module 351 and the SDK 353 may configure a framework (or a solution program) for performing a universal function. The client module 351 or the SDK 353 may configure a framework for processing a voice input. For example, the client module 351 may include a client (for example, a Bixby client) for participating in multi-device wakeup (MDW) in response to an utterance (for example, a call) of the user and performing an operation according to the utterance of the user.

According to various embodiment of the disclosure, the plurality of apps 355 may be programs for performing predetermined functions. For example, the plurality of apps 355 may include a first app 355-1 and a second app 355-2. The first app 355-1 and the second app 355-2 may be programs for performing different functions. For example, the plurality of apps 355 may include a plurality of operations for performing predetermined functions. For example, the plurality of apps 355 may include an alarm app, a message app, and/or a schedule app. For example, the plurality of apps 355 may be executed by the processor 360 and sequentially execute at least some of the plurality of operations.

According to various embodiment of the disclosure, the processor 360 may control the overall operation of the electronic device 300. For example, the processor 360 may be operatively connected to the communication interface 310, the microphone 320, the speaker 330, and the display 340 and allow the communication interface 310, the microphone 320, the speaker 330, and the display 340 to perform predetermined operations.

According to various embodiment of the disclosure, the processor 360 may execute the plurality of apps 355 and/or programs stored in the memory 350 to perform predetermined functions. For example, the processor 360 may execute at least one of the client module 351 or the SDK 353 and perform operations for processing a voice input. The processor 360 may control the operation of the plurality of apps 355 through the SDK 353. The operations described as the operations of the client module 351 or the SDK 353 may be operations due to execution by the processor 360.

According to various embodiment of the disclosure, the client module 351 may receive a voice input according to an utterance of the user. For example, the client module 351 may receive a voice signal corresponding to an utterance of the user detected through the microphone 320. The client module 351 may transmit the received voice input to the first server 200 (for example, the first server 108 of FIG. 1). The client module 351 may transmit state information of the electronic device 300 as well as the received voice input to the first server 200. For example, the state information of the electronic device 300 may include information on an operation execution state of the electronic device 300 and/or an execution state of the plurality of apps 355.

For example, the client module 351 may receive the result corresponding to the received voice input. When the result corresponding to the voice input received by the first server 200 can be calculated, the client module 351 may receive the result corresponding to the received voice input. The client module 351 may display the received result through the display 340.

For example, the client module 351 may receive a plan corresponding to the received voice input. The client module 351 may display the result of execution of at least one app according to the plan through the display 340.

For example, the client module 351 may sequentially display execution results of a plurality of operations on the display 340. The electronic device 300 may display only some results of execution of the plurality of operations (for example, only the result of the last operation) on the display 340.

For example, the client module 351 may receive a request for acquiring information required for calculating the result corresponding to the voice input from the first server 200. The client module 351 may transmit the required information to the first server 200 in response to the request.

For example, the client module 351 may transmit result information of execution of the plurality of operations according to the plan to the first server 200. The first server 200 may receive result information of execution of the plurality of operations according to the plan from the client module 351. The first server 200 may identify that the received voice input has been correctly processed using the result information.

For example, the client module 351 may include a voice recognition module. The client module 351 may recognize a voice input for performing a limited function through the voice recognition module. The client module 351 may perform a function of an intelligent app for processing the voice input through a predetermined input (for example, an utterance of the user) (for example, a wake-up input) as the organic operation.

According to various embodiment of the disclosure, the first server 200 (for example, the intelligent server or the first server 108 of FIG. 1) may be connected to the electronic device 300 (for example, a user terminal or the electronic device 101 of FIG. 1) through the network 4000 (for example, the first network 198 or the second network 199 of FIG. 1). The first server 200 may receive information related to a user voice input from the electronic device 300 through the network 4000.

For example, the first server 200 may convert data related to the received voice input into text data. The first server 200 may generate a plan for performing a task corresponding to the user voice input based on the text data.

For example, the plan may be generated by an artificial intelligence (AI) system. For example, the AI system may be a rule-based system. For example, the AI system may be a neural network-based system (for example, a feedforward neural network (FNN) or a recurrent neural network (RNN)). The AI system is not limited thereto and may be a combination of the above-mentioned things or another AI system. For example, the plan may be selected from a set of predetermined plans or generated in real time in response to a user request.

For example, the AI system may select at least one plan from among a plurality of predefined plans. For example, the first server 200 may transmit the result according to the generated plan to the electronic device 300 or transmit the generated plan to the electronic device 300. For example, the electronic device 300 may display the result according to the plan through the display 340. For example, the electronic device 300 may display the result of execution of the operation according to the plan through the display 340.

According to various embodiment of the disclosure, the first server 200 may include a front end 210, a natural language platform (NLP) 220, a capsule database (DB) 230, an execution engine 240, an end user interface 250, a management platform 260, big data platform 270, and an analytic platform 280.

According to various embodiment of the disclosure, the front end 210 may receive a voice input from the electronic device 300. The front end 210 may provide a response corresponding to the voice input to the NLP 220.

According to various embodiment of the disclosure, the NLP 220 may include an automatic speech recognition module (ASR module) 221, a natural language understanding module (NLU module) 223, a planner module 225, natural language generator module (NLG module) 227, and a text to speech module (TTS module) 229.

According to various embodiment of the disclosure, the ASR module 221 may convert the voice input received from the electronic device 300 into text data.

According to various embodiment of the disclosure, the NLU module 223 may detect a user's intention based on text data of the voice input. For example, the NLU module 223 may detect a user's intention by performing syntactic analysis or semantic analysis. For example, NLU module 223 may detect a meaning of a word extracted from the voice input based on linguistic features of morpheme or phrase and match the detected meaning of the word with the intention to determine the user's intention.

According to various embodiment of the disclosure, the planner module 225 may generate a plan based on the intention determined by the NLU module 223 and a parameter. For example, the planner module 225 may determine a plurality of domains required for performing a task based on the determined intention. The planner module 225 may determine a plurality of operations included in the plurality of domains determined based on the intention. For example, the planner module 225 may determine a parameter required for performing the plurality of determined operations or a result value output by execution of the plurality of the operations. The parameter and the result value may be defined by a concept of a predetermined type (or class). According to an embodiment of the disclosure, the plan may include a plurality of operations determined by the user's intent and a plurality of concepts. The planner module 225 may determine the relationship between the plurality of operations and the plurality concepts in stages (or hierarchically). For example, the planner module 225 may determine the execution order of the plurality of determined operations based on the user's intention according to the plurality of concepts. The planner module 225 may determine the execution order of the plurality of operations based on the parameter required for execution of the plurality of operations and the result output by execution of the plurality of operations. Accordingly, the planner module 225 may generate a plan including information on the relationship (for example, ontology) between the plurality of operations and the plurality of concepts. The planner module 225 may generate a plan by using information stored in the capsule DB 230 that stores a set of relationships between concepts and operations.

According to an embodiment of the disclosure, the NLG module 227 may change predetermined information in the form of text. The information converted into the text form may have the form in a natural language utterance.

According to an embodiment of the disclosure, the TTS module 229 may convert information in the text form into information in the voice form.

According to an embodiment of the disclosure, some or all of the functions of the NLP 220 can be implemented by the electronic device 300.

According to an embodiment of the disclosure, the capsule database 230 may store information on the relationship between a plurality of concepts and operations corresponding to a plurality of domains. For example, the capsule may include a plurality of operation objects (action objects or action information) and concept objects (or concept information) included in the plan.

According to an embodiment of the disclosure, the capsule DB 230 may store a plurality of capsules in the form of a concept action network (CAN). According to an embodiment of the disclosure, the plurality of capsules may be stored in a function registry included in the capsule DB 230.

According to an embodiment of the disclosure, the capsule DB 230 may include a strategy registry for storing strategy information required when a plan corresponding to a voice input is determined. When there are a plurality of plans corresponding to the voice input, the strategy information may include reference information for determining one plan.

According to an embodiment of the disclosure, the capsule DB 230 may include a follow up registry storing the following operation to suggest the following operation to the user in a predetermined situation. For example, the following operation may include the following utterance.

According to an embodiment of the disclosure, the capsule DB 230 may include a layout registry storing layout information which is information output through the electronic device 300. For example, the capsule DB 230 may include a vocabulary registry storing vocabulary information included in the capsule information. For example, the capsule DB 230 may include a dialogue registry storing information on dialogue (or interaction) with the user. For example, the capsule DB 230 may update the stored object through a developer tool.

For example, the developer tool may include a function editor for updating the operation object or the concept object. For example, the developer tool may include a vocabulary editor for updating a vocabulary. For example, the developer tool may include a strategy editor for generating and registering strategy to determine a plan. For example, the developer tool may include a dialog editor for generating dialog with the user.

For example, the developer tool may include a follow up editor for activating a follow up goal and editing a following speech that provides a hint. For example, the follow up goal may be determined based on a currently set goal, a user's preference, or an environment condition. For example, the capsule DB 230 can be implemented by the electronic device 300.

According to an embodiment of the disclosure, the execution engine 240 may obtain the result based on the generated plan.

According to an embodiment of the disclosure, the end user interface 250 may transmit the calculated result to the electronic device 300. Accordingly, the electronic device 300 may receive the result calculated by the execution engine 240 and provide the received result to the user.

According to an embodiment of the disclosure, the management platform 260 may mange information used by the first server 200.

According to an embodiment of the disclosure, the big data platform 270 may collect data on the user.

According to an embodiment of the disclosure, the analytic platform 280 may manage quality of service (QOS) of the first server 200. For example, the analytic platform 280 may manage elements of the first server 200 and a processing speed (or efficiency).

According to an embodiment of the disclosure, the second server 3000 may provide predetermined services (for example, product order, food order, ticket reservation, and hotel reservation) to the electronic device 300. For example, the second server 3000 may be a server operated by a third party. For example, the second server 3000 may provide information for generating a plan corresponding to the received voice input to the first server 200. Information provided from the second server 3000 to the first server 200 may be stored in the capsule DB 230. Further, the second server 3000 may provide result information according to the plan to the first server 200.

In the intelligent assistance system, the electronic device 300 may provide various assistance services to the user in response to a user input. For example, the user input may include an input through a physical button, a touch input, or a voice input by an utterance.

According to an embodiment of the disclosure, the electronic device 300 may provide a voice recognition service through an intelligent app (or a voice recognition app) stored therein. For example, the electronic device 300 may recognize a user utterance or a voice input received through the microphone 320, and provide a service corresponding to the recognized voice input to the user.

According to an embodiment of the disclosure, the electronic device 300 may perform a predetermined operation alone or along with the intelligent server and/or the service server based on the received voice input. For example, the electronic device 300 may execute an app corresponding to the received voice input and perform a predetermined operation through the executed app.

According to an embodiment of the disclosure, when the electronic device 300 provides an assistance service together with the first server 200 and/or the second server 3000, the electronic device 300 may detect a user utterance through the microphone 320 and generate a signal (or voice data) corresponding to the detected user utterance. The electronic device 300 may transmit the voice data to the first server 200 through the communication interface 310.

According to an embodiment of the disclosure, the first server 200 may generate a plan for performing a task corresponding to a voice input or generate the result of the operation according to the plan in response to the voice input received from the electronic device 300. The plan may include, for example, a plurality of operations for performing a task corresponding to the voice input of the user and a plurality of concepts related to the plurality of operations. The concepts may be parameters input by execution of the plurality of operations or may be defined for result values output by the execution of the plurality of operations. The plan may include the relationship between the plurality of operations and the plurality of concepts.

The electronic device 300 according to an embodiment of the disclosure may receive the response through the communication interface 310. The electronic device 300 may output a voice signal generated inside the electronic device 300 to the outside through the speaker 330 or output an image generated inside the electronic device 300 to the outside through the display 340.

Figure 3:
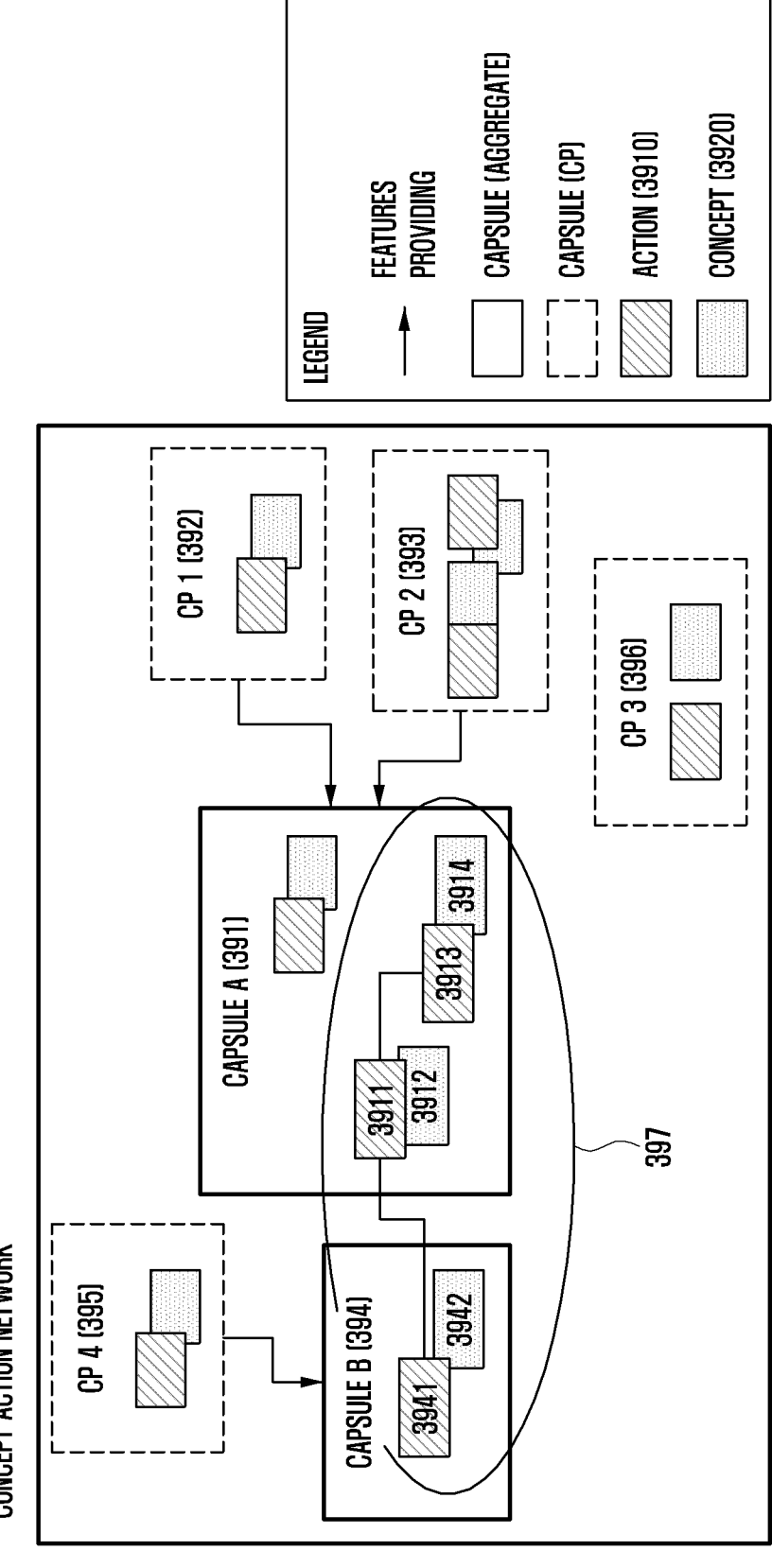
FIG. 3 illustrates storage of relation information between concepts and actions in a database according to various embodiment of the disclosure.

FIG. 3 illustrates storage of relation information between concepts and actions in a database according to various embodiment of the disclosure.

Referring to FIGS. 2 and 3, a capsule database (for example, the capsule DB 230) of the first server 200 may store capsules in the form of a concept action network (CAN). The capsule DB 230 may store an operation for processing a task corresponding to a user voice input and a parameter required for the operation in the form of a concept action network (CAN).

According to various embodiment of the disclosure, the capsule DB 230 may store a plurality of capsules (capsule A 391 and capsule B 394) corresponding a plurality of domains (for example, applications).

According to various embodiment of the disclosure, one capsule (for example, capsule A 391) may correspond to one domain (for example, location (geo) or application). Further, one capsule may correspond to at least one service provider (for example, CP 1 392, CP 2 393, or CP 3 396) for performing a function of the domain related to the capsule.

According to various embodiment of the disclosure, one capsule may include one or more operations 3910 for performing a predetermined function and one or more concepts 3920.

According to various embodiment of the disclosure, the NLP 220 may generate a plan for performing a task corresponding to a voice input received through the capsule stored in the capsule database. For example, the planner module 225 of the natural language platform may generate a plan through capsules stored in the capsule database. For example, a plan 397 may be generated using operations 3911 and 3913 and concepts 3912 and 3914 of the capsule A 391 and an operation 3941 and a concept 3942 of the capsule B 394, which communicates to CP 4 395.

Figure 4:
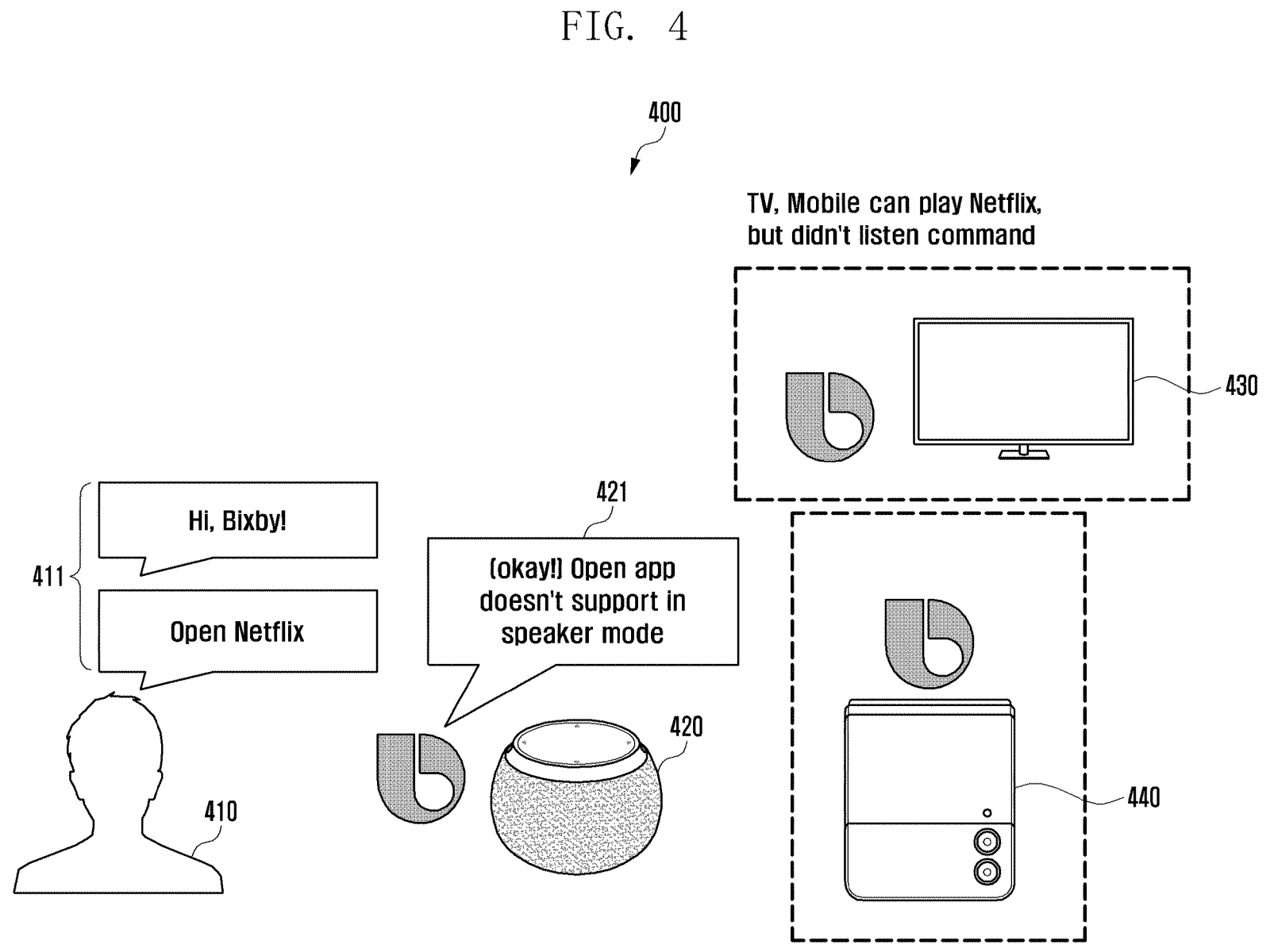
Figure 5:
FIG. 5 illustrates an MDW score table for determining a winner device in a multi-device wakeup (MDW) operation according to various embodiment of the disclosure.

FIG. 4 illustrates a multi-device wakeup (MDW) operation according to various embodiment of the disclosure. FIG. 5 illustrates an MDW score table 500 for determining a winner device in the MDW operation according to various embodiment of the disclosure.

Referring to FIGS. 4 and 5, in a multi-device environment 400 in which a plurality of electronic devices 420, 430, and 440 are located within a predetermined space, a user 410 may wake up one of the plurality of electronic devices 420, 430, and 440 through an utterance 411 to perform an operation.

According to various embodiment of the disclosure, when the user 410 speaks Hi, Bixby! Open Netflix as indicated by reference numeral 411, the plurality of electronic devices 420, 430, and 440 may recognize the utterance 411 of the user 410.

For example, when the plurality of electronic devices 420, 430, and 440 recognize the utterance 411 of the user 410, a winner device may be determined based on a multi-device operation according to the utterance 411 of the user 410 cannot be normally performed.

For example, the winner device selected by MDW contention recognizes the utterance 411 of the user 410 and performs the operation in the multi-device environment 400, but a device different from a command intention of the user 410 wakes up and the operation according to the utterance 411 of the user 410 cannot be normally performed.

As shown in case 1 in Table 1 below, when the speaker and the mobile phone located in the living room recognize the utterance 411 of the user 410, the speaker may be determined as the winner device. The speaker located in the living room cannot perform the operation (for example, Open Netflix) according to the utterance 411 of the user 410, and thus a question on which one of the TV and the mobile phone located in the living room that is the same space will perform the operation according to the utterance 411 may be made. Meanwhile, when the mobile phone is determined as the winner device, the search is performed for all devices since the mobile phone has no room information or the mobile phone may attempt the execution of the command of the utterance 411. In this case, the operation according to the utterance 411 intended by the user 410 may not be normally performed by the TV.

As shown in case 2 in Table 1 below, when the user 410 searches a device capable of performing the operation according to the utterance 411 in all electronic devices, a device which is not adjacent to the device recognizing the utterance 411 (for example, a device located in a different place) may be selected. Further, a device having no room information, such as a mobile phone, a tablet, or a smart watch, cannot be determined as an executor device to perform a command according to the utterance 411 of the user 410.

TABLE 1

| | | | | Case 1- search for room device such as winner | | |
| No | Device name | Participate in MDW | Goal to be achieved by corresponding device | 1-1, case in which winner is speaker | 1-2, case in which winner is mobile phone | Case 2- perform search in all devices |
|---|---|---|---|---|---|---|
| 1 | Living room TV | | tvLauncher, OpenApp | Inquire whether to perform operation in No. 1 or No. 3 | Perform search in all devices or perform utterance command according to its own device since mobile phone has no room information | Inquire whether to perform operation in No. 1, No. 3, or No. 4 |
| 2 | Living room speaker | O | noAction | | | |
| 3 | Mobile phone | O | Launcher, launchApplication | | | |
| 4 | Bedroom TV | | tvLauncher, OpenApp | | | |
| 5 | Bedroom speaker | | noAction | | | | wakeup (MDW) score. At this time, when an MDW score of the speaker 420 is 96, an MDW score of the TV 430 is 80, and an MDW score of the mobile phone 440 is 0, the speaker 420 having the highest MDW score is determined as the winner device. However, the speaker 420 determined as the winner device is a device which cannot perform an operation according to Open Netflix requested by the user 410 through the utterance 411, and thus cannot normally perform the operation according to the utterance 411 of the user 410 as indicated by reference numeral 421. The operation according to Open Netflix requested by the user 410 through the utterance 411 can be performed by the TV 430, but the TV 430 is not determined as the winner device, and thus the FIG. 6 illustrates an intelligent assistance system according to various embodiment of the disclosure.

Figure 6:
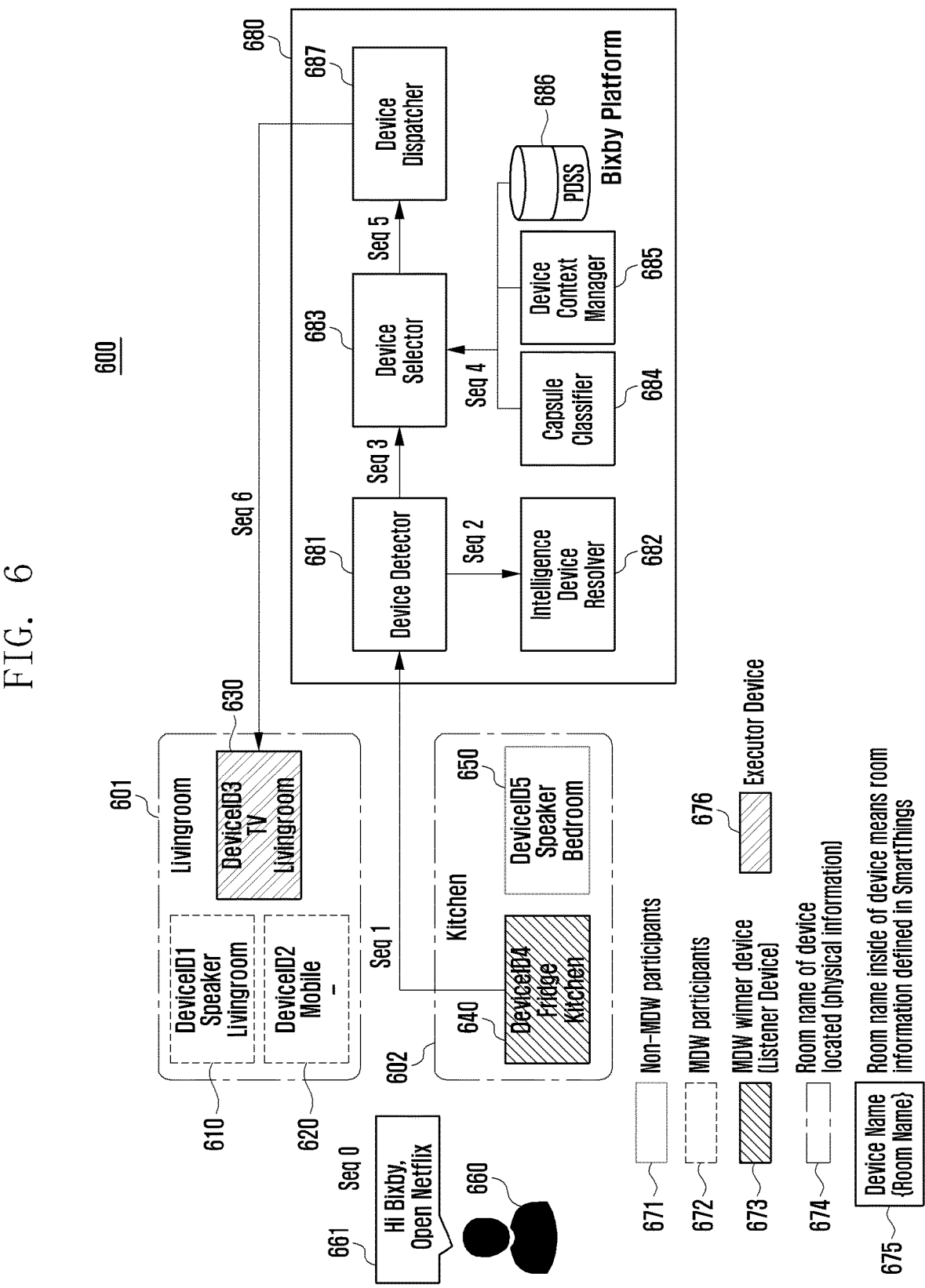
FIG. 6 illustrates an intelligent assistance system according to various embodiment of the disclosure.

Referring to FIG. 6, an intelligent assistance system 600 according to various embodiment of the disclosure may determine an electronic device intended by the user as an executor device and allow the electronic device intended by the user to perform an operation according to an utterance in the multi-device environment.

According to various embodiment of the disclosure, the intelligent assistance system 600 according to an embodiment of the disclosure may include a plurality of electronic devices 610, 620, 630, 640, and 650, and an assistance server 680.

According to various embodiment of the disclosure, the assistance server 680 according to an embodiment of the disclosure may include a device detector 681, an intelligence device resolver (IDR) 682, a device selector 683, a capsule classifier 684, a device context manager 685, a personal data sync service (PDSS) 686, and a device dispatcher 687.

For example, the IDR 682 may include at least one of an IoT server, a client for transmitting and receiving IoT information to and from another IoT server, a client for transmitting and receiving information through communication between IoT devices, and a database having IoT device information.

For example, among the plurality of electronic devices 610, 620, 630, 640, and 650, the first electronic device 610 (for example, a living room speaker), the second electronic device 620 (for example, a mobile phone), and the third electronic device 630 (for example, a TV) may be located in a first space 601 (for example, the living room).

For example, among the plurality of electronic devices 610, 620, 630, 640, and 650, the fourth electronic device 640 (for example, a refrigerator) and the fifth electronic device 650 (for example, a bedroom speaker) may be located in a second space 602 (for example, the kitchen). The fifth electronic device 650 (for example, a bedroom speaker) is physically located in the second space 602 (for example, the kitchen), but room information (for example, location information) stored in the IDR 682 of the assistance server 680 may be configured as the bedroom.

For example, physical locations and logical room information (for example, location information) of the first electronic device 610 (for example, the living room speaker), the second electronic device 620 (for example, the mobile phone), the third electronic device 630 (for example, the TV), and the fourth electronic device 640 (for example, the refrigerator) may the same among the plurality of electronic devices 610, 620, 630, 640, and 650.

For example, the physical location and the location of logical room information (for example, location information) of the fifth electronic device 650 may be different among the plurality of electronic devices 610, 620, 630, 640, and 650.

For example, among the plurality of electronic devices 610, 620, 630, 640, and 650, the first electronic device 610 (for example, the living room speaker) and the second electronic device 620 (for example, the mobile phone) located in the first space 601 (for example, the living room), and the fourth electronic device 640 (for example, the refrigerator) located in the second space 602 (for example, the kitchen) may be devices 672 participating in MDW contention.

For example, among the plurality of electronic devices 610, 620, 630, 640, and 650, the third electronic device 630 (for example, the TV) located in the first space 601 (for example, the living room) and the fifth electronic device 650 (for example, the bedroom speaker) located in the second space 602 (for example, the kitchen) may be devices 671 which do not participate in MDW contention.

According to an embodiment of the disclosure, the plurality of electronic devices 610, 620, 630, 640, and 650 may include an assistance client (for example, a Bixby client). The assistance client (for example, the Bixby client) included in the plurality of electronic devices 610, 620, 630, 640, and 650 may be software modules mounted to a device supporting an assistance service (for example, Bixby).

According to an embodiment of the disclosure, the user 660 may speak a call word (for example, "Hi Bixby!") and an instruction (for example, Open Netflix) as indicated by reference numeral 6610. In a first operation (Seq 0) of the intelligent assistance system 600, the plurality of electronic devices 610, 620, 630, 640, and 650 including the assistance client (for example, the Bixby client) may respond to the call word (for example, "Hi Bixby!") included in the utterance 661 of the user 660.

The electronic devices responding to the call word (for example, "Hi Bixby!") of the user 660 may participate in MDW contention. For example, among the plurality of electronic devices 610, 620, 630, 640, and 650, the first electronic device 610 (for example, the living room speaker), the second electronic device 620 (for example, the mobile phone), and the fourth electronic device 640 (for example, the refrigerator) recognizing the call word (for example, "Hi Bixby!") included in the utterance 661 of the user 660 may participate in MDW contention. For example, among plurality of electronic devices 610, 620, 630, 640, and 650, the third electronic device 630 (for example, the TV) and the fifth electronic device 650 (for example, the bedroom speaker) which do not recognize the call word (for example, "Hi Bixby!") included in the utterance 661 of the user 660 may not participate in MDW contention.

According to an embodiment of the disclosure, in a second operation (Seq 1) of the intelligent assistance system 600, a winner device 673 winning the MDW contention may be determined among the plurality of electronic devices 610, 620, 630, 640, and 650. For example, the winner 673 may be determined based on the MDW score table 500 illustrated in FIG. 5. However, the determination is not limited thereto, and the winner device 673 may be determined not only based on the MDW score table 500 but also through another method.

For example, among the plurality of electronic devices 610, 620, 630, 640, and 650, the fourth electronic device 640 may be determined as the winner device 673 in the MDW contention.

The fourth electronic device 640 determined as the winner device 673 in the MDW contention among the plurality of electronic devices 610, 620, 630, 640, and 650 may transfer identification information (MDW device IDs) of all devices participating in the MDW contention and information on the utterance 661 of the user 660 to the assistance server 680.

According to an embodiment of the disclosure, the device detector 681 may receive the identification information (MDW device IDs) of all devices participating in the MDW contention and the information on the utterance 661 of the user 660 from the fourth electronic device 640 determined as the winner device 673 in the MDW contention among the plurality of electronic devices 610, 620, 630, 640, and 650.

According to various embodiment of the disclosure, in a third operation (Seq 2) of the intelligent assistance system 600, the device detector 681 may transmit (for example, transfer or provide) the received identification information (MDW device IDs) of all devices and information on the utterance 661 of the user 660 to the IDR 682.

Figure 7:
FIG. 7 illustrates a message including identification information of all devices (MDW device IDs) according to various embodiment of the disclosure.

FIG. 7 illustrates a message 700 including identification information (MDW device IDs) of all devices according to various embodiment of the disclosure.

Referring to FIGS. 6 and 7, according to various embodiment of the disclosure, the device detector 681 may transmit (for example, transfer or provide) the identification information (MDW device IDs) of all devices and the information on the utterance 661 of the user 660 to the IDR 682 and/or the device selector 683. For example, the identification information (MDW device IDs) of all devices may include information on a device ID (deviceID), a service ID (serviceID), a Bixby device type (bixbyDeviceType), a device name (deviceName), a Bixby locale (bixbyLocale), a push ID (pushed), and an IoT device ID (iotDeviceId).

According to various embodiment of the disclosure, the device detector 681 may receive information on devices located near the real user 660 from the IDR 682. For example, it is possible to make an inquiry about information on not only devices corresponding to the identification information (MDW device IDs) of all devices but also devices in the turned on state in the same place by using room information 675 stored in the IDR 682 even though the identification information (MDW device IDs) of all devices is not transmitted.

According to various embodiment of the disclosure, the IDR 682 may make an inquiry about device information (for example, the room information 675) registered in the assistance service (for example, Bixby) and a state (for example, an operation state). The IDR 682 may search for a device registered in the room information 675 and control operations of the devices. For example, the IDR 682 may query an IoT server having IoT device information to receive the IoT device information. For example, the IDR 682 may make an inquiry about device information (For example, the room information 675) and the state (for example, the operation state). The IDR 682 (for example, the IoT server) may search for the device registered in the room information 675.

According to various embodiment of the disclosure, the IDR 682 may search for a device 671 which is registered in the same room information 675 but does not participate in MDW contention based on the received identification information (MDW device IDs) of all devices participating in MDW contention. The IDR 682 may receive information 674 of devices located in the physically same space. The IDR 682 may transfer the received information 674 on devices located in the physically same space to the device selector 683.

FIG. 8 illustrates an IoT device information message including room information according to various embodiment of the disclosure.

Referring to FIGS. 6 and 8, an IoT device information message 800 may include information 674 on devices located in the physically same space as the devices (including the winner device 673) participating in MDW contention, and IoT device information. For example, the IoT device information may include information on a device ID, a location name, a location ID (location ID), a room name (roomName), and a room ID (roomed).

According to various embodiment of the disclosure, the IDR 682 may search for a device by using the identification information (MDW device IDs) of all devices. For example, when the identification information (MDW device IDs) of all devices includes the first electronic device 610 (for example, the living room speaker) and the third electronic device 630 (for example, the TV) along with the mobile device even though the mobile device is determined as the winner device 673 of MDW contention, the IDR 682 may acquire a list of other home appliances located in the same room based on the room information 675. The IDR 682 may provide (for example, transfer or transmit) a list of the first electronic device 610 (for example, the living room speaker) and the third electronic device 630 (for example, the TV) located in the same room as the mobile device to the device detector 681 and/or the device selector 683 based on the room information 675. Accordingly, information on devices which do not support the identification information (MDW device IDs) of all devices or devices which do not participate in MDW contention may be shared and used by the assistance server 680.

According to various embodiment of the disclosure, in a fourth operation (Seq 3) of the intelligent assistance system 600, the device selector 683 may receive the identification information (MDW device IDs) of all devices from the device detector 681. The device selector 683 may receive a list of electronic devices (for example, the first electronic device 610 (for example, the living room speaker) and the third electronic device 630 (for example, the TV) located in the first space 601 (for example, the living room) which is the same as the mobile device based on the room information 675.

According to various embodiment of the disclosure, device selector 683 may select an executor device 676 to execute the final command according to the utterance 661 of the user 660 based on the identification information (MDW device IDs) of all devices.

According to various embodiment of the disclosure, in a fifth operation (Seq 4) of the intelligent assistance system 600, a capsule classifier 684 may classify a device capable of performing the operation according to the utterance 661 of the user 660 among various devices located in the same room. The device selector 683 may select the executor device 676 executing the final command of the user 660 by using the result of the performance by the capsule classifier 684.

According to various embodiment of the disclosure, the capsule classifier 684 may include a natural language understanding module (NLU module) (for example, the NLU module 223 of FIG. 2). For example, the capsule classifier 684 may determine a plurality of capsules (domains) required for performing a task by using an intention determined by the NLU module 223 and a parameter. Further, the plurality of devices may have different capsule databases, and the capsule classifier 684 may identify a device having a capsule (domain) for performing the operation according to the user utterance among the devices located in the same room. Further, the capsule classifier 684 may transfer capsule information which can be executed to the device selector 683 based on capsule information which can be executed in capsules within different capsule databases. The device selector 683 may select an executor device capable of executing the final command of the user based on the capsule information.

FIG. 6 illustrates the devices selector 683 and the capsule classifier 684 as separate elements and separately describes operations of the devices selector 683 and the capsule classifier 684. The disclosure is not limited thereto, and the device selector 683 and the capsule classifier 684 may be integrated into a single element to operate.

According to various embodiment of the disclosure, in a fifth operation (Seq 4) of the intelligent assistance system 600, the device selector 683 may receive device context (for example, whether media is reproduced or there is an alarm/timer) from the device context manager 685. The device selector 683 may select the executor device 676 executing the final command of the user 660 from among various devices located in the same room as the devices (including the winner device 673) participating in MDW contention based on the device context from the device context manager 685. For example, the device selector 683 may receive capsule (domain) information which can be executed based on the utterance of the user 660 received from the capsule classifier 684. The device selector 683 may select the executor device 676 executing the final execution command based on information transmitted from the device context manager 685 and the capsule classifier 684.

FIG. 6 illustrates the device selector 683 and the device context manager 685 as separate elements and separately describes operations of the device selector 683 and the device context manager 685. The disclosure is not limited thereto, and the device selector 683 and the device context manager 685 may be integrated into a single element to operate.

According to various embodiment of the disclosure, the PDSS 686 may perform a function of synchronizing contacts and an installed app list from the client. In the fifth operation (Seq 4) of the intelligent assistance system 600, the device selector 683 may select the executor device 676 executing the final command of the user 660 from among various devices located in the same room as the devices (including the winner device 673) participating in MDW contention based on information received from the PDSS 686.

According to various embodiment of the disclosure, in a sixth operation (Seq 5) of the intelligent assistance system 600, information on the executor device 676 selected by the device selector 683 may be transmitted (for example, transferred or provided) to the device dispatcher 687.

According to various embodiment of the disclosure, the device dispatcher 687 may receive information on the executor device 676 from the device selector 683.

According to various embodiment of the disclosure, the device dispatcher 687 may transmit (for example, transfer or provide) information on a command (for example, Open Netflix) included in the utterance 661 of the user 660 to the electronic device (for example, the third electronic device 630 (for example, the TV)) selected as the executor device 676 among the plurality of devices.

For example, the executor device 676 may be selected from among the plurality of devices by the device selector 683, and a command to be executed by the executor device 676 has been determined. Accordingly, the executor device 676 receiving the information on the executor device and the information on the command (for example, Open Netflix) included in the utterance 661 of the user 660 from the device dispatcher 687 may directly execute the command (for example, Open Netflix) included in the utterance 661 of the user 660 without performing a capsule classification process.

It is possible to select the executor device 676 which fits the intention of the utterance 661 of the user 660 and normally perform the command according to the utterance 661 of the user through the first operation (Seq 0) to the sixth operation (Seq 5) of the intelligent assistance system 600.

FIG. 9 is a diagram 900 illustrating a method of operating an electronic device according to various embodiment of the disclosure.

Referring to FIG. 9, detailed examples of the first operation (Seq 0) to the third operation (Seq 2) among the first operation (Seq 0) to the sixth operation (Seq 5) of the intelligent assistance system 600 described above with reference to FIGS. 6 and 9 are described below.

According to various embodiment of the disclosure, the executor device 676 may be selected using the identification information (MDW device IDs) of electronic devices located in the same space as the devices (including the winner device 673) participating in MDW contention, and the room information.

According to various embodiment of the disclosure, when the electronic device which does not participates in MDW contention is located in the same space as the device participating in the MDW contention, the electronic device which does not participates in the MDW contention may be also selected as the executor device 676 by using the identification information (MDW device ID) of the electronic device and the room information.

For example, the first electronic device 610 (for example, the living room speaker), the second electronic device 620 (for example, the mobile phone), and the fourth electronic device 901 (for example, the fourth electronic device 640 (for example, the refrigerator) of FIG. 6) may participate in MDW contention, and the third electronic device 630 (for example, the TV) and the fifth electronic device 650 (for example, the bedroom speaker) may not participate in MDW contention.

In operation 910, the fourth electronic device 901 or 640 (for example, the refrigerator) participating in the MDW contention may be determined as the winner device 673. In this case, the fourth electronic device 901 or 640 (for example, the refrigerator) determined as the winner device 673 may transmit (for example, transfer or provide) identification information (MDW device IDs) of all devices and information (for example, "Open Netflix") on the utterance 661 of the user 660 to a device detector 902 (for example, the device detector 681 of FIG. 6) of the assistance server 680.

In operation 920, the device detector 902 or 681 may make a request for inquiring about device information of the fourth electronic device 901 or 640 (for example, the refrigerator) determined as the winner device 673 and the first electronic device 610 (for example, the living room speaker) and the second electronic device 620 (for example, the mobile phone) participating in the MDW contention to an IDR 903 (for example, the IDR 682 of FIG. 6).

In operation 930, the IDR 903 or 682 may make an inquiry about device information of the first electronic device 610 (for example, the living room speaker), the second electronic device 620 (for example, the mobile phone), and the fourth electronic device 901 or 640 (for example, refrigerator) participating in the MDW contention requested by the device detector 902 or 681 and acquire the device information of the first electronic device 610 (for example, the living room speaker), the second electronic device 620 (for example, the mobile phone), and the fourth electronic device 901 or 640 (for example, refrigerator).

For example, the device detector 902 or 681 may make a request for device information of electronic devices located in the same space (for example, the first space 601 (living room), the second space 602, or the kitchen) as the devices (including the winner device 673) participating in the MDW contention to the IDR 903 or 682.

For example, the IDR 903 or 682 may make an inquiry about the device information of the first electronic device 610 (for example, the living room speaker) having room information and the fourth electronic device 901 or 640 (for example, refrigerator) having room information and acquire the device information of the first electronic device 610 (for example, the living room speaker) and the fourth electronic device 901 or 640 (for example, refrigerator).

For example, the IDR 903 or 682 may identify IoT device information (for example, IoT device IDs) of the first electronic device 610 (for example, the living room speaker) and the fourth electronic device 901 or 640 (for example, refrigerator).

For example, the IDR 903 may identify first IoT device information (for example, IoT device IDs) of the first electronic device 610 (for example, the living room speaker) and the fourth electronic device 901 or 640 (for example, the refrigerator). The IDR 903 may acquire device information and second IoT device information (for example, IoT device IDs) of not only the electronic devices (for example, the first electronic device 610 and the fourth electronic device 901 or 640) registered in Bixby based on the identified first IoT device information (for example, the IoT device IDs) but also the third electronic device 630 (for example, the TV) located in the same space (for example, the living room 601).

For example, the IDR 903 or 682 may transmit (transfer or provide) a message including device information of the third electronic device 630 (for example, the TV) as well as the device information of the first electronic device 610 (for example, the living room speaker), the second electronic device 620 (for example, the mobile phone), and the fourth electronic device 901 or 640 (for example, the refrigerator) participating in MDW contention to the device detector 902 or 681.

For example, the fifth electronic device 650 (for example, the bedroom speaker) corresponding to the device 671 which does not participate in MDW contention is physically located in the second space 602 (for example, the kitchen), but the logical location may be configured as a third space (for example, the bedroom) different from the first space 601 and the second space 603 in the room information of the fifth electronic device 650 (for example, the bedroom speaker).

When the room information of the fifth electronic device 650 (for example, the bedroom speaker) is configured as the third space, the IDR 903 or 682 may not insert device information of the fifth electronic device 650 (for example, the bedroom speaker) into the message since the room information is different from the first space 601 and the second space 602 in which the devices 672 participating in MDW contention are located.

Referring to Table 2 below, when the first electronic device 610 (for example, the living room speaker) and the winner device 673. The command (for example, "Open Netflix") according to the utterance 611 of the user 660 may be executed through the third electronic device 630 (for example, the TV) selected as the executor device 676.

For example, when the second electronic device 620 (for example, the mobile phone) is determined as the winner device 673 in MDW contention, the third electronic device 630 (for example, the TV) may be selected as the executor device 676 using device information and room information of the third electronic device 630 (for example, the TV) located in the same space (for example, the first space 601 or the living room) as the devices participating in MDW contention.

Here, the command (for example, "Open Netflix") according to the utterance 611 of the user 660 is likely to be executed in the second electronic device 620 (for example, the mobile phone). In this case, it may be identified whether the command (for example, "Open Netflix") according to the utterance 611 of the user 660 can be executed in the second electronic device 620 (for example, the mobile phone) based on the capsule classification result of the second electronic device 620 (for example, the mobile phone). When an app (for example, a Netflix app) for executing the command (for example, "Open Netflix") according to the utterance 611 of the user 660 is not installed in the second electronic device 620 (for example, the mobile phone), the third electronic device 630 (for example, the TV) may be selected as the executor device 676 using device information and room information of the third electronic device 630 (for example, the TV) located in the same space (for example, the first space 601 or the living room). The command (for example, "Open Netflix") according to the utterance 611 of the user 660 may be executed through the third electronic device 630 (for example, the TV) selected as the executor device 676.

TABLE 2

| No | Device name | Participate in MDW contention | Goal to be achieved by corresponding device | Case3-seach for room device such as MDWDeviceID (+identify whether app is install) | |
| --- | --- | --- | --- | --- | --- |
| | | | | 3-1, case in which winner is speaker | 3-1, case in which winner is speaker |
| 1 | Living room TV | | tvLauncher, OpenApp | Open Netflix in No. 1 (TV) | Open Netflix in No. 1 (TV) |
| 2 | Living room speaker | O | noAction | | |
| 3 | Mobile phone (in which Netflix is not installed) | O | Launcher, launchApplication | | |
| 4 | Bedroom TV | | tvLauncher, OpenApp | | |
| 5 | Bedroom speaker | | noAction | | | second electronic device 620 (for example, the mobile phone) located in the first space 601 (for example, the living room) participate in MDW contention, a command (for example, "Open Netflix") according to the utterance 611 of the user 660 may be executed without any error.

For example, when the first electronic device 610 (for example, the living room speaker) is determined in the winner device 673 in MDW contention, the third electronic device 630 (for example, the TV) may be selected as the executor device 676 using device information and room information of the third electronic device 630 (for example, the TV) located in the same space (for example, the first space 601 or the living room) as the first electronic device 610 (for example, the living room speaker) which is the FIG. 10 is a diagram 1000 illustrating a user interface for selecting an executor device in a multi-device environment according to various embodiment of the disclosure.

Referring to FIGS. 6 and 10, according to various embodiment of the disclosure, a user interface 1010 which inquires the user 660 about a device to be selected as the executor device 676 from among the plurality of devices 610, 620, 630, 640, and 650 may be displayed through a display of a device (for example, the electronic device 101 of FIG. 1, the second electronic device 620 of FIG. 6, or the mobile phone) of the user 660. When the command (for example, "Open Netflix") according to the utterance 611 of the user 660 can be executed in both the third electronic device 630 (for example, the TV) and the second electronic device 620 (for example, the mobile phone) located in the first space 601 (for example, the living room), the user 660 may be asked for the device to be selected as the executor device 676 through the user interface 1010. The user 660 may select the executor device 676 through the user interface 1010, and the executor device 676 may be determined according to selection of the user 660.

According to an embodiment of the disclosure, when the user 660 selects the executor device 676 to execute the command (for example, "Open Netflix") according to the utterance 611 of the user 660, transmission of the command to the executor device 676 may be displayed through the user interface 1020.

The electronic device (for example, the assistance server 680 of FIG. 6) according to an embodiment of the disclosure may include a device detector (for example, the device detector 681 of FIG. 6), an IDR (for example, the intelligence device resolver (IDR) 682 of FIG. 6), and a device selector (for example, the device selector 683 of FIG. 6). The device detector 681 may receive user utterance information and identification information of multi-device wakeup (MDW) devices participating in MDW contention from a first electronic device selected in the MDW contention. The IDR 682 may identify room information for locations of the MDW devices, based on the identification information of the MDW devices, and acquire device information of the MDW devices and devices located in an equal space to the MDW devices. The device selector 683 may execute a command according to the user utterance based on the device information of the MDW devices and the devices located in the equal space to the MDW devices.

According to an embodiment of the disclosure, the IDR 682 may acquire device information of first devices participating in the MDW contention and device information of second devices, which do not participate in the MDW contention, based on the room information for the locations of the MDW devices.

According to an embodiment of the disclosure, the IDR 682 may acquire first room information of the MDW devices and second room information of the devices located in the equal space to the MDW devices. The device information of the MDW devices may be acquired based on the first room information. The device information of the devices located in the equal space to the MDW devices may be acquired based on the second room information.

According to an embodiment of the disclosure, the device selector 683 may select the executor device, based on the room information for the locations of the MDW devices, the device information of the first devices participating in the MDW contention, and the device information of the second devices, which do not participate in the MDW contention.

According to an embodiment of the disclosure, the device selector 683 may execute capsule classification of the first devices participating in the MDW contention and the second devices, which do not participate in the MDW contention. A device capable of executing the command according to the user utterance may be selected as the executor device based on the capsule classification result.

According to an embodiment of the disclosure, the device selector 683 may execute capsule classification of the first devices participating in the MDW contention and the second devices, which do not participate in the MDW contention. The device selector 683 may receive capsule information which can be executed from the capsule classifier 684. The device selector 683 may select the device capable of executing the command according to the user utterance as the executor device based on the capsule information which can be executed.

According to an embodiment of the disclosure, the device selector 683 may select a device capable of executing the command according to the user utterance as the executor device from among the first devices participating in the MDW contention.

According to an embodiment of the disclosure, the device selector 683 may select a device capable of executing the command according to the user utterance as the executor device from among the second devices which do not participate in the MDW contention.

According to an embodiment of the disclosure, when case that room information of a second electronic device located in a physically equal space to the first devices participating in the MDW contention is different from the room information of the first devices participating in the MDW contention, the device selector 683 may exclude the second electronic device from selection of the executor device.

According to an embodiment of the disclosure, the device detector 681 may provide identification information of all devices connected through communication to the IDR 682. The identification information of all devices may include a device ID (deviceID), a service ID (serviceID), a Bixby device type (bixbyDeviceType), a device name (deviceName), a Bixby locale (bixbyLocale), a push ID (pushID), and an IoT device ID (iotDeviceId).

According to an embodiment of the disclosure, a device dispatcher for transferring the command according to the user utterance to the executor device may be included.

A method of operating an electronic device according to an embodiment of the disclosure may include receiving user utterance information and identification information of multi-device wakeup (MDW) devices participating in MDW contention from a first electronic device selected in the MDW contention. Room information for locations of the MDW devices may be identified based on the identification information of the MDW devices. Device information of the MDW devices and devices located in an equal space to the MDW devices may be acquired. An executor device to execute a command according to a user utterance may be selected based on the device information of the MDW devices and the devices located in the equal space to the MDW devices.

According to an embodiment of the disclosure, device information of first devices participating in the MDW contention and device information of second devices, which do not participate in the MDW contention, may be acquired based on the room information for the locations of the MDW devices.

According to an embodiment of the disclosure, first room information of the MDW devices and second room information of the devices located in the equal space to the MDW devices may be acquired. The device information of the MDW devices may be acquired based on the first room information. The device information of the devices located in the equal space to the MDW devices may be acquired based on the second room information.

According to an embodiment of the disclosure, the executor device may be selected based on the room information for the locations of the MDW devices, the device information of the first devices participating in the MDW contention, and the device information of the second devices, which do not participate in the MDW contention.

According to an embodiment of the disclosure, capsule classification of the first devices participating in the MDW contention and the second devices, which do not participate in the MDW contention, may be executed. A device capable of executing the command according to the user utterance may be selected as the executor device based on the capsule classification result.

According to an embodiment of the disclosure, capsule classification of the first devices participating in the MDW contention and the second devices, which do not participate in the MDW contention, may be executed. Capsule information which can be executed may be acquired. A device capable of executing the command according to the user utterance may be selected as the executor device on the capsule information which can be executed.

According to an embodiment of the disclosure, a device capable of executing the command according to the user utterance may be selected as the executor device from among the first devices participating in the MDW contention.

According to an embodiment of the disclosure, a device capable of executing the command according to the user utterance may be selected as the executor device from among the second devices which do not participate in the MDW contention.

According to an embodiment of the disclosure, when room information of a second electronic device located in a physically equal space to the first devices participating in the MDW contention is different from the room information of the first devices participating in the MDW contention, the second electronic device may be excluded from selection of the executor device.

According to an embodiment of the disclosure, identification information of all devices connected through communication may be acquired. The identification information of all devices may include a device ID (deviceID), a service ID (serviceID), a Bixby device type (bixbyDeviceType), a device name (deviceName), a Bixby locale (bixbyLocale), a push ID (pushID), and an IoT device ID (iotDeviceId).

According to an embodiment of the disclosure, the command according to the user utterance may be transferred to the executor device.

According to an electronic device and a method of operating the same according to an embodiment of the disclosure, the final operation performance result may be close to a user's intention although a device which is not intended by the user wakes up by the MDW in the multi-device environment.

According to an electronic device and a method of operating the same according to an embodiment of the disclosure, even a device (mobile device) of which a client is not updated by the user or which has no location information can infer a place by using neighbor device information. Accordingly, it is possible to increase the accuracy of determining a device to perform an operation according to a user utterance by using the place for finding information on devices located in the same space.

According to an electronic device and a method of operating the same according to an embodiment of the disclosure, when a final device implementing the result selected by a capsule classifier is selected, not only information on devices located in the same space but also content including an installed application, whether media is reproduced, and restriction information, such as a device or a country may be referred to. Therefore, it is possible to select a device suitable for a user's intention and perform the final operation.

While the disclosure has been shown and described with reference to various embodiments thereof, it will be understood by those skilled in the art that various changes in form and details may be made therein without departing from the spirit and scope of the disclosure as defined by the appended claims and their equivalents.

Each embodiment described with reference to FIGS. 6 to 10 may be implemented independently. Additionally, it can be implemented by combining at least two or more embodiments.

What is claimed is:

1. An electronic device comprising:
   a device detector configured to receive user utterance information and identification information of multi-device wakeup (MDW) devices participating in MDW contention from a first electronic device selected in the MDW contention;
   an intelligence device resolver (IDR) configured to:
      identify room information for locations of the MDW devices, based on the identification information of the MDW devices, and
      acquire device information of the MDW devices and devices located in an equal space to the MDW devices; and
   a device selector configured to select an executor device to execute a command according to a user utterance, based on the device information of the MDW devices and the devices located in the equal space to the MDW devices.

2. The electronic device of claim 1, wherein the IDR is further configured to acquire device information of first devices participating in the MDW contention and device information of second devices, which do not participate in the MDW contention, based on the room information for the locations of the MDW devices.

3. The electronic device of claim 1, wherein the IDR is further configured to:
   acquire first room information of the MDW devices and second room information of the devices located in the equal space to the MDW devices,
   acquire the device information of the MDW devices, based on the first room information, and
   acquire the device information of the devices located in the equal space to the MDW devices, based on the second room information.

4. The electronic device of claim 2, wherein the device selector is further configured to select the executor device, based on the room information for the locations of the MDW devices, the device information of the first devices participating in the MDW contention, and the device information of the second devices, which do not participate in the MDW contention.

5. The electronic device of claim 2, wherein the device selector is further configured to:
   execute capsule classification of the first devices participating in the MDW contention and the second devices, which do not participate in the MDW contention, and
   select a device capable of executing the command according to the user utterance as the executor device, based on executable capsule information.

6. The electronic device of claim 1, wherein the device selector is further configured to select a device capable of executing the command according to the user utterance as the executor device from among the first devices participating in the MDW contention.

7. The electronic device of claim 2, wherein the device selector is further configured to select a device capable of executing the command according to the user utterance as the executor device from among the second devices which do not participate in the MDW contention.

8. The electronic device of claim 2, wherein, in case that room information of a second electronic device located in a physically equal space to the first devices participating in the MDW contention is different from the room information of the first devices participating in the MDW contention, the device selector is further configured to exclude the second electronic device from selection of the executor device.

9. The electronic device of claim 1,
wherein the device detector is further configured to provide identification information of all devices connected through communication to the IDR, and
wherein the identification information of the all devices comprises a device identification (ID) (deviceID), a service ID (serviceID), a Bixby device type (bixbyDeviceType), a device name (deviceName), a Bixby locale (bixbyLocale), a push ID (pushID), and an Internet of things (IOT) device ID (iotDeviceId).

10. The electronic device of claim 1, further comprising:
a device dispatcher configured to transfer the command according to the user utterance to the executor device.

11. A method of operating an electronic device, the method comprising:
receiving user utterance information and identification information of multi-device wakeup (MDW) devices participating in MDW contention from a first electronic device selected in the MDW contention;
identifying room information for locations of the MDW devices, based on the identification information of the MDW devices;
acquiring device information of the MDW devices and devices located in an equal space to the MDW devices; and
selecting an executor device to execute a command according to a user utterance, based on the device information of the MDW devices and the devices located in the equal space to the MDW devices.

12. The method of claim 11, further comprising:
acquiring device information of first devices participating in the MDW contention and device information of second devices, which do not participate in the MDW contention, based on the room information for the locations of the MDW devices.

13. The method of claim 11, further comprising:
acquiring first room information of the MDW devices and second room information of the devices located in the equal space to the MDW devices;
acquiring the device information of the MDW devices, based on the first room information; and
acquiring the device information of the devices located in the equal space to the MDW devices, based on the second room information.

14. The method of claim 12, further comprising:
selecting the executor device, based on the room information for the locations of the MDW devices, the device information of the first devices participating in the MDW contention, and the device information of the second devices, which do not participate in the MDW contention.

15. The method of claim 12, further comprising:
executing capsule classification of the first devices participating in the MDW contention and the second devices, which do not participate in the MDW contention; and
selecting a device capable of executing the command according to the user utterance as the executor device, based on executable capsule information.

16. The method of claim 12, further comprising:
selecting a device capable of executing the command according to the user utterance as the executor device from among the first devices participating in the MDW contention.

17. The method of claim 12, further comprising:
selecting a device capable of executing the command according to the user utterance as the executor device from among the second devices which do not participate in the MDW contention.

18. The method of claim 14, further comprising:
in case that room information of a second electronic device located in a physically equal space to the first devices participating in the MDW contention is different from the room information of the first devices participating in the MDW contention, excluding the second electronic device from selection of the executor device.

19. The method of claim 11, further comprising:
acquiring identification information of all devices connected through communication,
wherein the identification information of the all devices comprises a device identification (ID) (deviceID), a service ID (serviceID), a Bixby device type (bixbyDeviceType), a device name (deviceName), a Bixby locale (bixbyLocale), a push ID (pushID), and an Internet of things (IOT) device ID (iotDeviceId).

20. The method of claim 11, further comprising transferring the command according to the user utterance to the executor device.

21. One or more non-transitory computer-readable storage media storing computer-executable instructions that, when executed by at least one processor, configure an electronic device to perform operations comprising:
receiving user utterance information and identification information of multi-device wakeup (MDW) devices participating in MDW contention from a first electronic device selected in the MDW contention;
identifying room information for locations of the MDW devices, based on the identification information of the MDW devices;
acquiring device information of the MDW devices and devices located in an equal space to the MDW devices; and
selecting an executor device to execute a command according to a user utterance, based on the device information of the MDW devices and the devices located in the equal space to the MDW devices.

* * * * *